US009825845B2

(12) United States Patent
Wang et al.

(10) Patent No.: US 9,825,845 B2
(45) Date of Patent: *Nov. 21, 2017

(54) PATH COMPUTATION METHOD, PATH COMPUTATION ELEMENT, NODE DEVICE, AND NETWORK SYSTEM

(71) Applicant: Huawei Technologies Co., Ltd., Shenzhen (CN)

(72) Inventors: Yu Wang, Shenzhen (CN); Jun Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/732,198

(22) Filed: Jun. 5, 2015

(65) Prior Publication Data

US 2015/0271055 A1 Sep. 24, 2015

Related U.S. Application Data

(63) Continuation of application No. 13/269,240, filed on Oct. 7, 2011, now Pat. No. 9,054,944, which is a (Continued)

(30) Foreign Application Priority Data

Apr. 8, 2009 (CN) .......................... 2009 1 0133506

(51) Int. Cl.
*H04L 12/28* (2006.01)
*H04L 12/729* (2013.01)
(Continued)

(52) U.S. Cl.
CPC .......... *H04L 45/125* (2013.01); *H04J 3/1611* (2013.01); *H04J 3/1652* (2013.01);
(Continued)

(58) Field of Classification Search
None
See application file for complete search history.

(56) References Cited

U.S. PATENT DOCUMENTS 5,570,084 A   10/1996   Ritter et al.
7,725,603 B1 * 5/2010 Kanevsky ............... H04L 45/02
                                                                 709/204
(Continued)

FOREIGN PATENT DOCUMENTS

CN          101296178 A     10/2008

OTHER PUBLICATIONS

Berger, "Generalized Multi-Protocol Label Switching (GMPLS) Signaling Functional Description" Network Working Group. Jan. 2003, 34 pages.
(Continued)

*Primary Examiner* — Steven H Nguyen
(74) *Attorney, Agent, or Firm* — Brinks Gilson & Lione

(57) ABSTRACT

The present invention provides a path computation method, a Path Computation Element (PCE), a node device, and a network system. The method includes: receiving a path computation request message (S201), where the path computation request message carries a network type identifier and traffic parameter constraint conditions of a path required to be computed, and the network type identifier indicates a type of a network where the path required to be computed locates; determining the network through the network type identifier, and computing the path in the network according to the traffic parameter constraint conditions (S202); and sending a path computation response message (S203), where the path computation response message carries the computed path. The problem of distinguishing and computing Traffic Engineer (TE) paths for various types of services in a multi-region convergence network is solved.

3 Claims, 6 Drawing Sheets

Related U.S. Application Data continuation of application No. PCT/CN2010/071518, filed on Apr. 2, 2010.

(51) Int. Cl.
*H04L 12/701* (2013.01)
*H04L 12/717* (2013.01)
*H04J 3/16* (2006.01)

(52) U.S. Cl.
CPC .............. *H04L 45/00* (2013.01); *H04L 45/42* (2013.01); *H04J 2203/0098* (2013.01)

(56) References Cited

U.S. PATENT DOCUMENTS

| | | | | |
|---|---|---|---|---|
| 9,054,944 | B2* | 6/2015 | Wang | H04L 45/00 |
| 2002/0071451 | A1* | 6/2002 | Korpela | H04Q 11/0478 |
| | | | | 370/469 |
| 2003/0026268 | A1* | 2/2003 | Navas | H04L 29/12009 |
| | | | | 370/400 |
| 2003/0142677 | A1* | 7/2003 | Story | H04L 43/0811 |
| | | | | 370/395.1 |
| 2005/0071453 | A1* | 3/2005 | Ellis | H04L 12/2602 |
| | | | | 709/223 |
| 2006/0171320 | A1 | 8/2006 | Vasseur et al. | |
| 2008/0225723 | A1* | 9/2008 | Lee | H04J 14/0271 |
| | | | | 370/235 |
| 2009/0228575 | A1* | 9/2009 | Thubert | H04L 45/128 |
| | | | | 709/220 |

OTHER PUBLICATIONS

Hoehrmann, "Scripting Media Types" Network Working Group, Apr. 2006, 15 pages.
Mannie et al., "Generalized Multi-Protocol Label Switching (GMPLS) Extensions for Synchronous Optical Network (SONET) and Synchronous Digital Hierarchy (SDH) Control", Network Working Group, Aug. 2006, 25 pages.
Oki et al., "Extensions to the Path Computation Element Communication Protocol (PCEP) for Inter-Layer MPLS and GMPLS Traffic Engineering" Network Working Group, Dec. 2008, 16 pages.
Papadimitriou, "Ethernet Traffic Parameters" Network Working Group, Jul. 12, 2008, 13 pages.
Papadimitriou, "Ethernet Traffic Parameters" Network Working Group, Apr. 7, 2009, 13 pages.
Papadimitriou, "Generalized Multi-Protocol Label Switching (GMPLS) Signaling for Extensions for G.709 Optical Transport Networks Control", Network Working Group, Jan. 2006, 23 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            Bandwidth                          |
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Profile   |     Index     |            Reserved            |
+-+-+-+-+-+-+-+-+-+-+-+-+-+-+-+-+-+-+-+-+-+-+-+-+-+-+-+-+-+-+-+-+
|                              CIR                               |
+-+-+-+-+-+-+-+-+-+-+-+-+-+-+-+-+-+-+-+-+-+-+-+-+-+-+-+-+-+-+-+-+
|                              CBS                               |
+-+-+-+-+-+-+-+-+-+-+-+-+-+-+-+-+-+-+-+-+-+-+-+-+-+-+-+-+-+-+-+-+
|                              EIR                               |
+-+-+-+-+-+-+-+-+-+-+-+-+-+-+-+-+-+-+-+-+-+-+-+-+-+-+-+-+-+-+-+-+
|                              EBS                               |
+-+-+-+-+-+-+-+-+-+-+-+-+-+-+-+-+-+-+-+-+-+-+-+-+-+-+-+-+-+-+-+-+
```

PATH COMPUTATION METHOD, PATH COMPUTATION ELEMENT, NODE DEVICE, AND NETWORK SYSTEM

CROSS-REFERENCE TO RELATED APPLICATIONS

This application is a continuation of U.S. patent application Ser. No. 13/269,240, filed on Oct. 7, 2011, which is a continuation of International Application No. PCT/CN2010/071518, filed on Apr. 2, 2010. The International Application claims priority to Chinese Patent Application No. 200910133506.9, filed on Apr. 8, 2009. The afore-mentioned patent applications are hereby incorporated by reference in their entireties.

FIELD OF THE INVENTION

The present invention relates to the field of communication technologies, and in particular, to the field of path computation technologies in a network, and more particularly, to a path computation method, a Path Computation Element (PCE), a node device, and a network system.

BACKGROUND OF THE INVENTION

Traffic Engineering (TE) route computation in a single-region or a multi-region environment is the Central Processing Unit (CPU) intensive computation. Especially in the case of implementing a Constraint Shortest Path First (CSPF) algorithm, how to compute an optimal route is a complicated problem. In addition, in a network, a distributed computed node is hard to have a total Traffic Engineer Data Base (TEDB) in some cases. Therefore, a centralized special PCE is proposed in order to separate a path computation function from an Ingress node (physically or logically) in distributed computing.

In an existing Multi-region Network (MRN), a path is computed by using a separate TE PCE server to be responsible for related TE path computation functions. A unit that requests path computation is referred to as a Path Computation Client (PCC).

A PCE is a functional entity responsible for path computation in a network, and computes a TE path meeting constraint conditions, based on a known topological structure and constraint conditions of a network, according to the request of the PCC. The PCE may locate in any place of a network, and may be integrated in a network device, or may be a separate device. The Path Computation Client (PCC) requests the PCE to compute a path, and receives the path returned from the PCE. The PCC and the PCE, as well as the PCE and another PCE, communicate through a PCE Protocol (PCEP), and a PCEP message is used to submit a path computation request and obtain a path computation result.

In the path computation request in the current PCEP, only one filed "BANDWIDTH" is used to represent bandwidth traffic information of a path. FIG. 1 shows a specific format of the field "BANDWIDTH", and the field is floating-point values. In an existing path computation method, the PCE computes a path according to the field "BANDWIDTH". However, as the network is flattened and a variety of network technologies are converged, a node needs to support many switching capabilities, for example, wavelength switching, Time Division Multiplexing (TDM) switching, and packet switching. A network formed of such a node is an MRN, and Label Switch Paths (LSPs) of various Switching Granularity types coexist in the network, for example, a wavelength LSP, a TDM LSP, and an Ethernet packet switching LSP. Therefore, the existing path computation method cannot completely meet the path computation requirements in an MRN.

SUMMARY OF THE INVENTION

Embodiments of the present invention provide a path computation method, a PCE, a node device, and a network system, so as to achieve the computation of TE paths in an MRN.

An embodiment of the present invention provides a path computation method, where the method includes:

receiving a path computation request message, wherein the path computation request message includes data that defines a network type identifier and traffic parameter constraint conditions of a path required to be computed, and the network type identifier indicates a type of a network where the path required to be computed is located, wherein the network type identifier indicates that the network where the path required to be computed is located is at least one of: a Synchronous Digital Hierarchy (SDH) network, an Optical Transport Network (OTN) or an Ethernet network;

computing the path in consideration of the network type identifier and the traffic parameter constraint conditions; and sending a path computation response message, where the path computation response message carries the computed path.

An embodiment of the present invention provides a path computation method, where the method includes:

sending a path computation request message to a Path Computation Element (PCE), wherein the path computation request message includes data that defines a network type identifier and traffic parameter constraint conditions of a path required to be computed, and the network type identifier indicates a type of a network where the path required to be computed is located, wherein the network type identifier indicates that the network where the path required to be computed is located is at least one of: a Synchronous Digital Hierarchy (SDH) network, an Optical Transport Network (OTN) or an Ethernet network; and receiving a path computation response message that includes data that defines the path and is returned from the PCE, wherein the path is obtained after the PCE computes the path in consideration of the network type identifier and the traffic parameter constraint conditions.

An embodiment of the present invention provides a PCE, where the PCE includes:

a request receiving module configured to receive a path computation request message, wherein the path computation request message includes data that defines a network type identifier and traffic parameter constraint conditions of a path required to be computed, and the network type identifier indicates a type of a network where the path required to be computed is located, wherein the network type identifier indicates that the network where the path required to be computed is located is at least one of: a Synchronous Digital Hierarchy (SDH) network, an Optical Transport Network (OTN) or an Ethernet network;

a computation module configured to determine the network through the network type identifier, and compute the path in the network according to the traffic parameter constraint conditions; and a path sending module configured to send a path computation response message, wherein the path computation response message includes data that defines the computed path.

The present invention has the following beneficial effects. A manner of carrying the network type identifier in the path computation request message is adopted, and the path is computed in the network according to the traffic parameter constraint conditions after the network is determined through the network type identifier, so as to overcome the technical problem that the path computation requests in different network regions cannot be distinguished.

BRIEF DESCRIPTION OF THE DRAWINGS

The accompanying drawings illustrated herein are provided for further understanding the embodiments of the present invention and form a part of this application, and are not intended to limit the present invention, where.

DETAILED DESCRIPTION OF THE EMBODIMENTS

In order to make the objectives, technical solutions, and advantages of the present invention more comprehensible and clearer, the following further describes the present invention in detail with reference to embodiments and the accompanying drawings. Herein, the schematic embodiments and descriptions of the present invention are provided for illustration of the present invention, and not intended to limit the present invention.

Embodiment 1

Figures 1, 2:
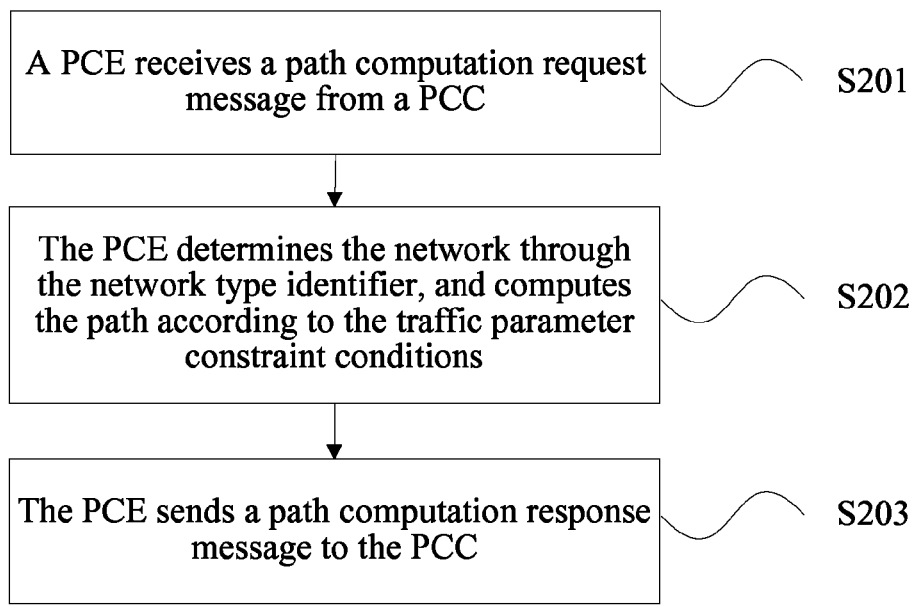
FIG. 1 is a specific format of an object <BANDWIDTH> in a format of a path computation request message in the prior art.
FIG. 2 is a flow chart of a path computation method according to Embodiment 1 of the present invention.

FIG. 2 is a flow chart of a path computation method according to Embodiment 1 of the present invention. As shown in FIG. 2, the path computation method according to Embodiment 1 of the present invention includes the following steps.

In step S201, a PCE receives a path computation request message from a PCC, where the path computation request message carries a network type identifier and traffic parameter constraint conditions of a path required to be computed, and the network type identifier indicates a type of a network where the path required to be computed locates.

In step S202, the PCE determines the network through the network type identifier, and computes the path in the network according to the traffic parameter constraint conditions.

In step S203, the PCE sends a path computation response message to the PCC, where the path computation response message carries the computed path.

According to the embodiment of the present invention, a manner of carrying the network type identifier in the path computation request message is adopted, and the path is computed in the network according to the traffic parameter constraint conditions after the network is determined through the network type identifier, so as to overcome the technical problems that the path computation requests in different regions cannot be distinguished, and the bandwidth of floating-point values cannot definitely define path traffic parameter constraints, thereby solving the problem of distinguishing and computing TE paths for various types of services in a multi-region convergence network.

Embodiment 2

Figure 3:
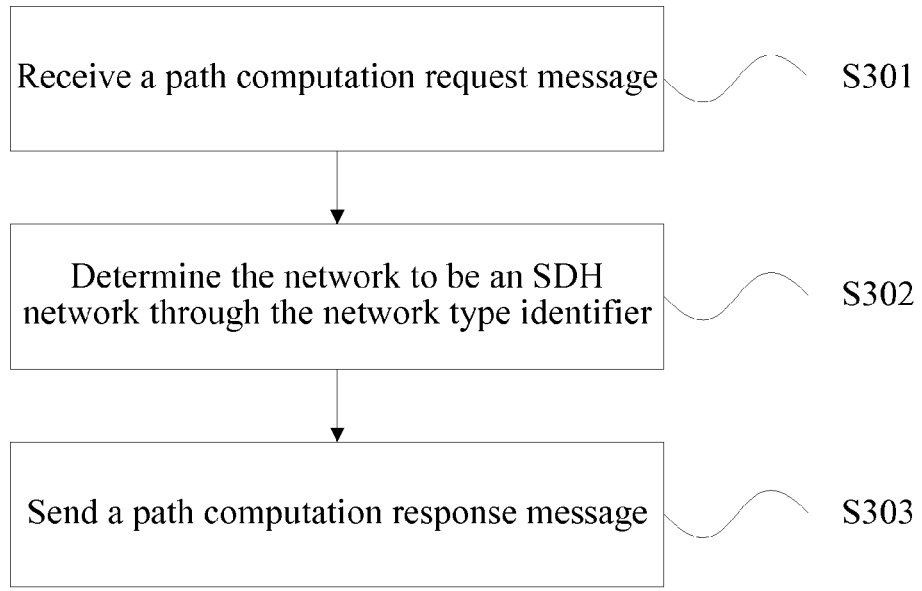
FIG. 3 is a flow chart of a path computation method according to Embodiment 2 of the present invention.
Figure 4:
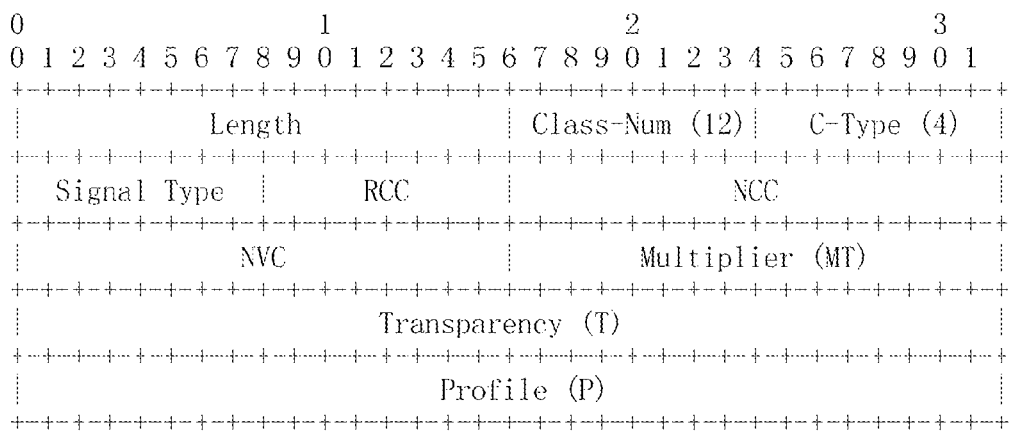
FIG. 4 is a specific format of a Sender Traffic Specification of a Synchronous Digital Hierarchy (SDH) according to Embodiment 2 of the present invention.

FIG. 3 is a flow chart of a path computation method according to Embodiment 2 of the present invention. FIG. 4 is a specific format of a Sender Traffic Specification of an SDH according to Embodiment 2 of the present invention.

As shown in FIG. 3, the path computation method according to Embodiment 2 of the present invention includes the following steps.

In step S301, a path computation request message is received, where the path computation request message carries a network type identifier and traffic parameter constraint conditions of a path required to be computed, the network type identifier indicates that a network where a path required to be computed locates is an SDH network, and the traffic parameter constraint conditions include a signal type, a concatenation type, and the number of components.

Specifically, a PCC sends the path computation request message to a PCE, where the network type identifier and the traffic parameter constraint conditions of the path required to be computed may be carried in an object SDH SENDER_TSPEC (SDH Sender Traffic Specification) of the path computation request. The traffic parameter constraint conditions may include transparent transmission and monitoring, in addition to the signal type, the concatenation type, and the number of components.

The SDH SENDER_TSPEC may adopt the format as shown in FIG. 4. Class-Num, C-Type, Signal Type, and Multiplier are mandatory, and at least one of fields Number of Contiguous Components (NCC) and Number of Virtual Components (NVC) is present.

The fields are defined as follows.

Length is used to represent a length of the field SDH SENDER_TSPEC.

Fields Class-Num and C-Type are used in combination to represent a network type identifier of an SDH network, where the Class-Num represents a main category, and has a value of 12, and C-Type represents a sub-category, and has a value of 4. In this embodiment, a network type identifier having the main category of 12, and the sub-category of 4 is used to represent the SDH network.

Signal Type is used to represent a signal type, that is, a basic unit of a signal in a path, for example, VC-3 or VC-4.

NCC is used to represent the number of basic units of signals contained in a contiguous component when a concatenation type used is the contiguous component. For example, when the basic unit of a signal is VC-4, and a contiguous component formed of four VC-4s is used, a value of the NCC is 4. The field may be used alone, or in combination with a field Requested Contiguous Concatenation (RCC) below; when the field is absent or has a value of 0, it is represented that the contiguous component may be not supported.

RCC is used to represent a format of the contiguous component when a concatenation type used is the contiguous component. When the field has a value of 1, it is represented that a contiguous component format specified in an existing standard is used; the field is an optional field, and can only be used in combination with the field NCC.

NVC is used to represent the number of basic units of signals contained in a virtual component when a concatenation type used is the virtual component. For example, when the basic unit of a signal is VC-4, and a virtual component formed of four VC-4s is used, a value of the NCC is 4; when the field is absent or has a value of 0, it is represented that the contiguous component may be not supported, and the four VC-4s may be expressed as VC4×4.

Multiplier is used to represent the number of components, which is a natural number. When the virtual component and the contiguous component are not used, for example, in a case that the fields NCC and NVC are absent, the value represents the number of basic units of a signal used. When the contiguous component is used instead of the virtual component, for example, in a case that the field NCC is present and is not 0, and the field NVC is absent, the value represents the number of contiguous components used; when the virtual component is used instead of the contiguous component, for example, in a case that the field NVC is present and is not 0, and the field NCC is absent, the value represents the number of virtual components used; when both the contiguous component and the virtual component are used, for example, in a case that the fields NCC and NVC are present and are not 0, the value represents the number of virtual components used.

Transparency (T) is used to represent whether to support the transparent transmission function. Different values of Transparency (T) may represent that different overheads may be transparently transmitted. For example, a value of 1 represents that a regenerator section overhead may be transparently transmitted; a value of 0 represents that a multiplex section overhead may be transparently transmitted; the filed may be an optional field, and when the field is absent, it is represented that the transparent transmission function may be not supported.

Profile (P) is an attribute field, which is used to represent whether to support functions other than the functions represented by the above fields, for example, a monitoring function, and the field is an optional field.

In step S302, the network is determined to be an SDH network through the network type identifier; the path is computed in the SDH network according to the traffic parameter constraint conditions.

According to the traffic parameter constraint conditions including the signal type, the concatenation type, and the number of components, the PCE excludes links that do not meet the traffic parameter constraint conditions, and computes the path with an algorithm. For example, when a value of Multiplier is 2, a value of the field Signal Type is VC-4, and a value of the field NCC is 4, it is represented that links whose bandwidth does not support two VC-4×4 contiguous components need to be excluded during path computation. When a value of Transparency (T) is 1, it is represented that links that do not support the regenerator section overhead function of the transparent transmission need to be excluded during computation.

In step S303, a path computation response message is sent, where the path computation response message carries the computed path.

The PCE sends the path computation response message to the PCC, where the path computation response message carries the computed path.

Embodiment 3

Figure 5:
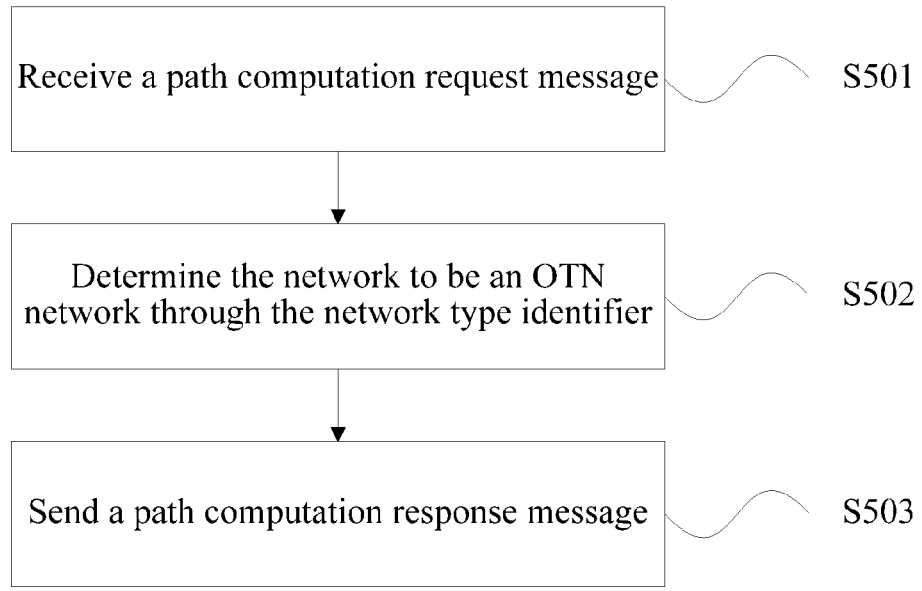
FIG. 5 is a flow chart of a path computation method according to Embodiment 3 of the present invention.
Figure 6:
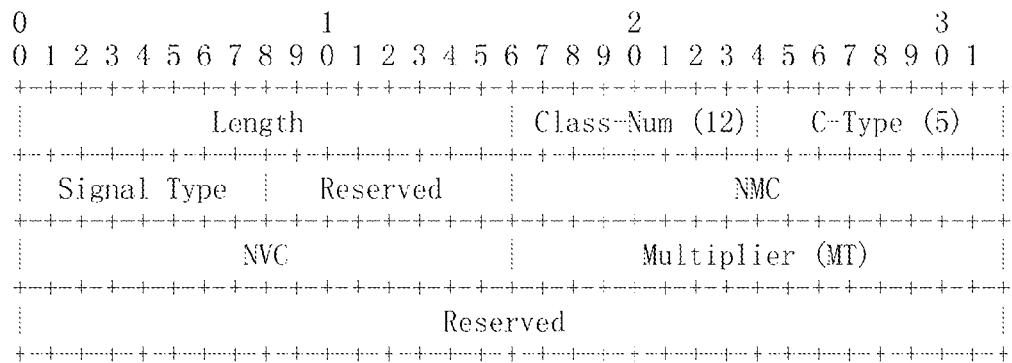
FIG. 6 is a specific format of a Sender Traffic Specification of an Optical Transport Network (OTN) according to Embodiment 3 of the present invention.

FIG. 5 is a flow chart of a path computation method according to Embodiment 3 of the present invention. FIG. 6 is a specific format of a Sender Traffic Specification of an OTN according to Embodiment 3 of the present invention.

As shown in FIG. 5, the path computation method according to Embodiment 3 of the present invention includes the following steps.

In step S501, a path computation request message is received, where the path computation request message carries a network type identifier and traffic parameter constraint conditions of a path required to be computed, the network type identifier indicates that a network where the path required to be computed locates is an OTN network, and the traffic parameter constraint conditions include a signal type, a concatenation type, and the number of components.

Specifically, a PCC sends the path computation request message to a PCE, where the network type identifier and the traffic parameter constraint conditions of the path required to be computed may be carried in an object OTN SENDER_TSPEC (OTN Sender Traffic Specification) of the path computation request message.

The OTN SENDER_TSPEC may adopt the format as shown in FIG. 6. Class-Num, C-Type, Signal Type, and Multiplier are mandatory, and at least one of fields NCC and NVC is present.

The fields are defined as follows.

Length is used to represent a length of the field OTN SENDER_TSPEC.

Fields Class-Num and C-Type are used in combination to represent a network type identifier of an OTN network, where the Class-Num represents a main category, and has a value of 12, and C-Type represents a sub-category, and has a value of 5. In this embodiment, a network type identifier having a main category of 12, and a sub-category of 5 is used to represent the OTN network.

Signal Type is used to represent a signal type, that is, a basic unit of a signal in a path, for example, ODU1 or ODU2.

Number of Multiplexed Components (NMC) is used to represent the number of basic units of signals contained in a multiplexed component when a concatenation type used is the multiplexed component. For example, when the basic unit of a signal is ODU1, and a multiplexed component formed of four ODU1s is used, a value of the NMC is 4; when the field is absent or has a value of 0, it is represented that the multiplexed component may be not supported.

NVC is used to represent the number of basic units of signals contained in a virtual component when a concatenation type used is the virtual component. For example, when the basic unit of a signal is ODU1, and a virtual component formed of four ODU1s is used, a value of the NVC is 4, and the four ODU1s may be expressed as ODU1×4.

Multiplier is used to represent the number of components, which is a natural number. When the virtual component and the multiplexed component are not used, for example, in a case that the fields NMC and NVC are absent, the value represents the number of basic units of a signal used. When the multiplexed component is used instead of the virtual component, for example, in a case in that the field NMC is present and is not 0, and the field NVC is absent, the value represents the number of the multiplexed components used; when the virtual component is used instead of the multiplexed component, for example, in a case that the field NVC is present and is not 0, and the field NMC is absent, the value represent the number of the virtual components used; when both the multiplexed component and the virtual component are used, for example, in a case that the fields NMC and NVC are not 0, the value represents the number of the virtual components used.

In step S502, the network is determined to be an OTN network through the network type identifier, and the path is computed in the OTN network according to the traffic parameter constraint conditions.

According to the traffic parameter constraint conditions including the signal type, the concatenation type, and the number of components, the PCE excludes links that do not meet the traffic parameter constraint conditions, and computes the path with an algorithm. For example, when a value of Multiplier is 2, a value of the field Signal Type is ODU1, and a value of the field NVC is 4, it is represented that links whose bandwidth does not support two ODU1×4 contiguous components need to be excluded in path computation.

In step S503, a path computation response message is sent, where the path computation response message carries the computed path.

The PCE sends the path computation response message to the PCC, where the path computation response message carries the computed path.

Embodiment 4

Figure 7:
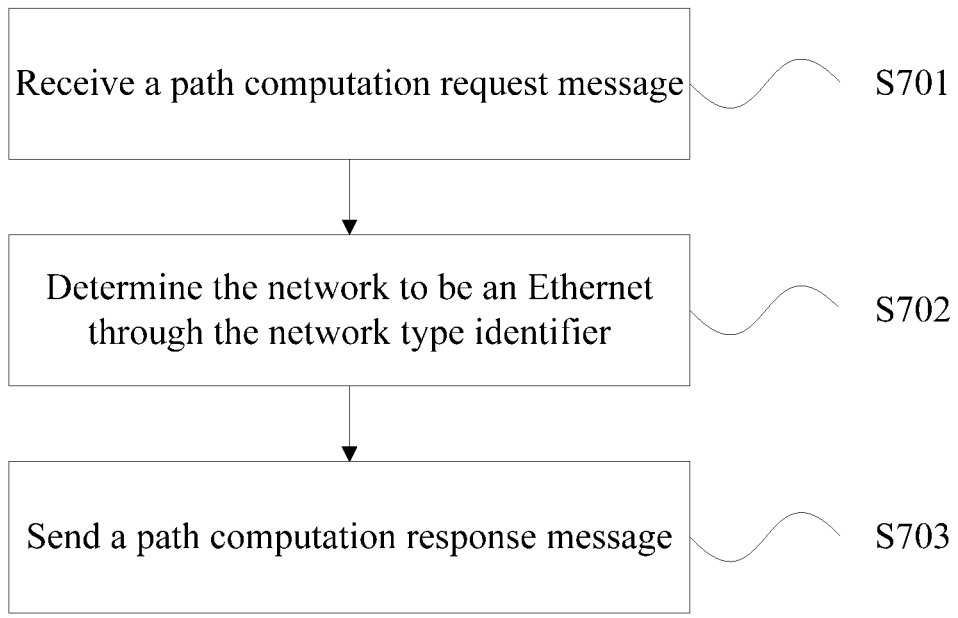
FIG. 7 is a flow chart of a path computation method according to Embodiment 4 of the present invention.
Figure 8:
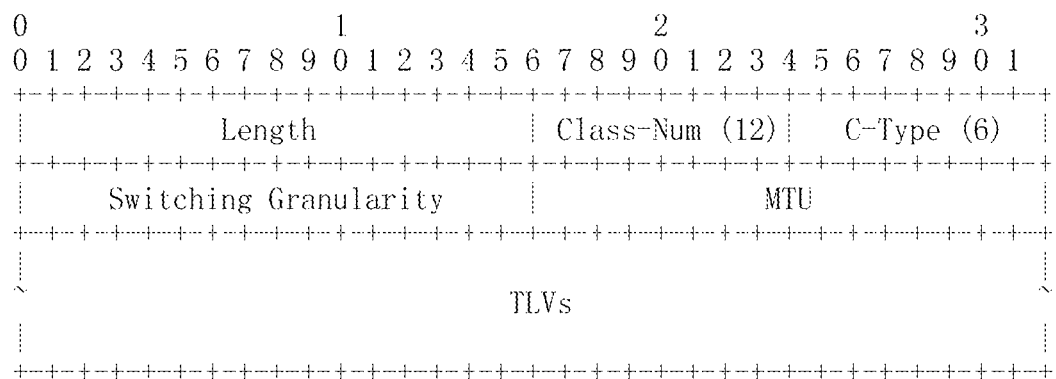
FIG. 8 is a specific format of a Sender Traffic Specification of an Ethernet according to Embodiment 4 of the present invention.
Figures 9, 10:
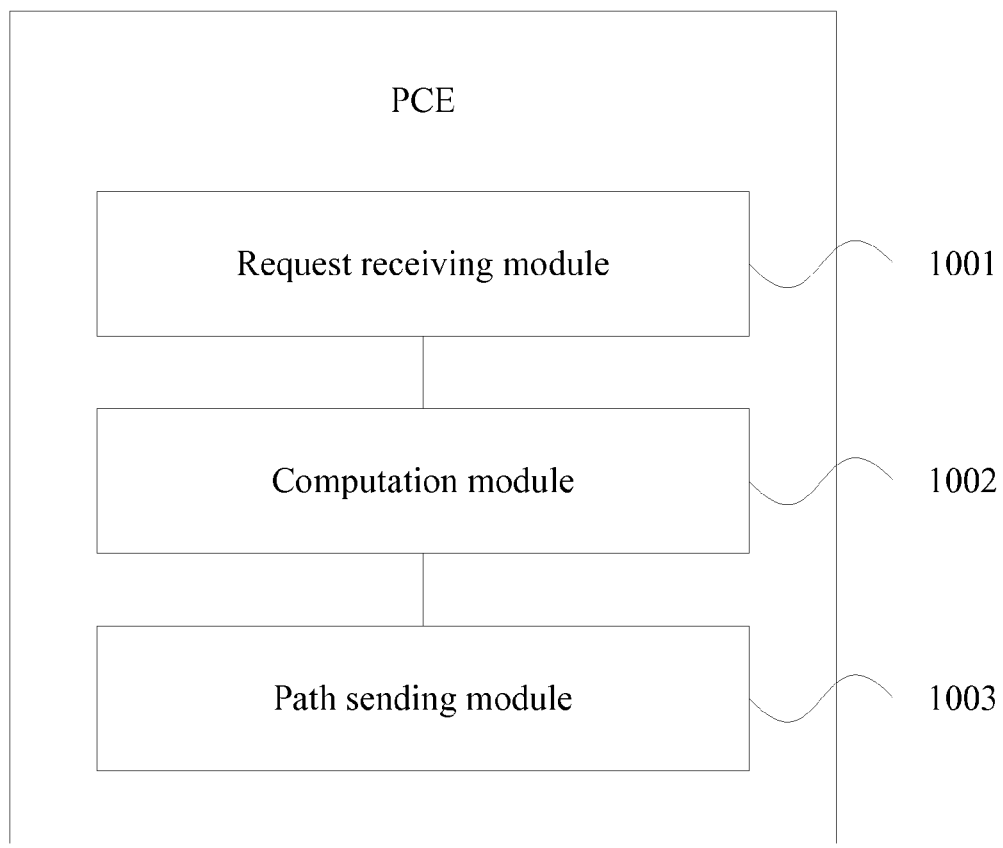
FIG. 9 is a schematic diagram of a Type-Length-Value (TLV) of the Sender Traffic Specification of the Ethernet according to Embodiment 4 of the present invention.
FIG. 10 is a block diagram of a structure of a PCE according to Embodiment 5 of the present invention.

FIG. 7 is a flow chart of a path computation method according to Embodiment 4 of the present invention. FIG. 8 is a specific format of a Sender Traffic Specification of an Ethernet according to Embodiment 4 of the present invention. FIG. 9 is a schematic diagram of a TLV of the Sender Traffic Specification of the Ethernet according to Embodiment 4 of the present invention.

As shown in FIG. 7, the path computation method according to Embodiment 4 of the present invention includes the following steps.

In step S701, a path computation request message is received, where the path computation request message carries a network type identifier and traffic parameter constraint conditions of a path required to be computed, the network type identifier indicates that a network where the path required to be computed locates is an Ethernet, and the traffic parameter constraint conditions include a Switching Granularity, and a Maximal Transmission Unit (MTU).

Specifically, a PCC sends the path computation request message to a PCE, where the network type identifier and the traffic parameter constraint conditions of the path required to be computed may be carried in an object ETH SENDER_TSPEC (Ethernet Sender Traffic Specification) of the path computation request message. The traffic parameter constraint conditions may include a Committed Information Rate (CIR), a Committed Burst Size (CBS), an Excess Information Rate (EIR), an Excess Burst Size (EBS), and a link color, in addition to the Switching Granularity and the MTU.

The ETH SENDER_TSPEC may adopt the format as shown in FIG. 8, a TLV contained in the ETH SENDER_TSPEC is as shown in FIG. 9, and the fields are defined as follows.

Length is used to represent a length of the field ETH SENDER_TSPEC.

Fields Class-Num and C-Type are used in combination to represent a network type identifier of an Ethernet, where Class-Num represents a main category, and has a value of 12, and C-Type represents a sub-category, and has a value of 6. In this embodiment, a network type identifier having a main category of 12, and a sub-category of 6 is used to represent the Ethernet.

Switching Granularity represents a minimal unit of service transmission on a link, and a value of 1 represents that a port of a node on the link is used as the minimal unit of the service transmission; a value of 2 represents that an Ethernet frame is used as the minimal unit of the service transmission, for example, a Virtual Local Area Network (VLAN) frame is used as the minimal unit of the service transmission.

MTU represents maximal bytes contained in each data packet transferred in a network.

Profile (attribute) is a link function attribute field, for example, a value of 2 may be used to represent a requirement for a link color attribute.

Index is used to represent bandwidths allocated to various classes of services when multiple traffic classes of services need to be borne.

CIR is a maximal information rate committed to support in a normal case.

CBS is a maximal information rate committed to support in a burst case.

EIR is an excess maximal information rate capable of being supported in a normal case.

EBS is an excess maximal information rate capable of being supported in a burst case.

In step S702, the network is determined to be an Ethernet through the network type identifier, and the path is computed in the Ethernet according to the traffic parameter constraint conditions.

According to the traffic parameter constraint conditions including the Switching Granularity and the MTU, a PCE excludes links that do not meet the traffic parameter constraint conditions, and computes the path with an algorithm. Examples of the traffic parameter constraint conditions are as follows. A value of 1 of the field Switching Granularity represents that a link needs to support that a port of a node on the link is used as a minimal unit of service transmission; a value 1500 bits of the field MTU represents that a maximal transmission unit of the link is 1500 bits; a value of 2 of the field Profile represents that the link must support a color attribute; a value of 10 Mbit/s of the field CIR represents that an information rate committed to support in a normal case is not permitted to exceed 10 Mbit/s.

In step S703, a path computation response message is sent, where the path computation response message carries the computed path.

The PCE sends the path computation response message to the PCC, where the path computation response message carries the computed path.

Embodiment 5

FIG. 10 is a block diagram of a structure of a PCE according to Embodiment 5 of the present invention. As shown in FIG. 10, the PCE according to Embodiment 5 of the present invention includes: a request receiving module 1001, configured to receive a path computation request message, where the path computation request message carries a network type identifier and traffic parameter constraint conditions of a path required to be computed, and the network type identifier indicates a type of a network where the path required to be computed locates; a computation module 1002, configured to determine the network through the network type identifier, and compute the path in the network according to the traffic parameter constraint conditions; and a path sending module 1003, configured to send a path computation response message, where the path computation response message carries the computed path.

In the PCE according to Embodiment 5 of the present invention, the request receiving module 1001 (for example, a PCE) receives the path computation request message from a PCC first, where the path computation request message carries the network type identifier and the traffic parameter constraint conditions of the path required to be computed, and the network type identifier indicates the type of the network where the path required to be computed locates.

Then, the computation module 1002 determines the network through the network type identifier, and computes the path in the network according to the traffic parameter constraint conditions.

Finally, the path sending module 1003 sends the path computation response message to the PCC, where the path computation response message carries the computed path.

According to Embodiment 5 of the present invention, a manner of carrying the network type identifier in the path computation request message is adopted, and the path is computed in the network according to the traffic parameter constraint conditions after the network is determined through the network type identifier, so as to overcome the technical problems that the path computation requests in different regions cannot be distinguished, and the bandwidth of floating-point values cannot definitely define path traffic parameter constraints, thereby solving the problem of distinguishing and computing TE paths for various types of services in a multi-region convergence network.

Embodiment 6

Figure 11:
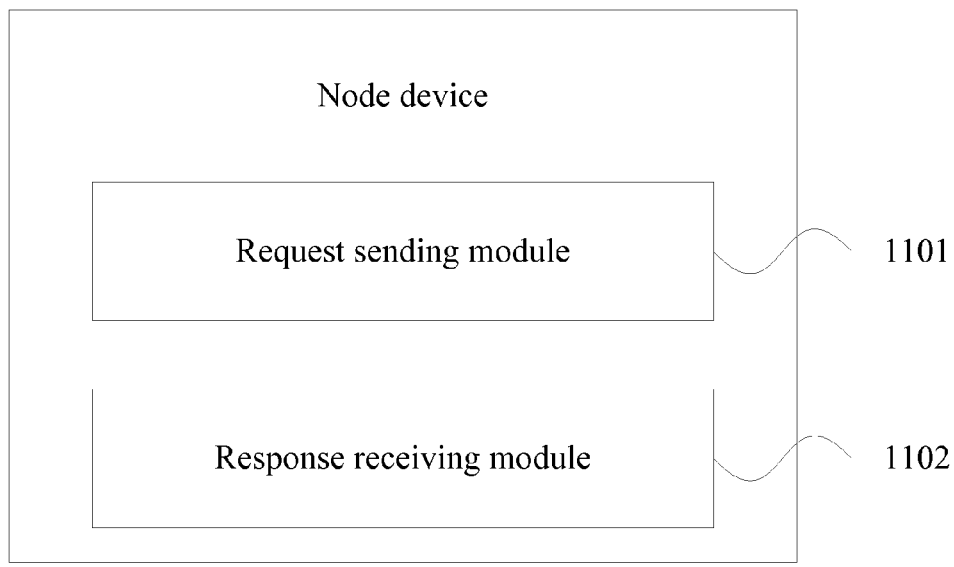
FIG. 11 is a block diagram of a structure of a node device according to Embodiment 6 of the present invention.

FIG. 11 is a block diagram of a structure of a node device according to Embodiment 6 of the present invention. As shown in FIG. 11, the node device according to Embodiment 6 of the present invention includes: a request sending module 1101, configured to send a path computation request message to a PCE, where the path computation request message carries a network type identifier and traffic parameter constraint conditions of a path required to be computed, the network type identifier indicates a type of a network where the path required to be computed locates; a response receiving module 1102, configured to receive a path computation response message that carries the path and is returned from the PCE, where the path computation response message carries the computed path, and the path is obtained after the PCE determines the network through the network type identifier and computes in the network according to the traffic parameter constraint conditions.

Embodiment 7

Figure 12:
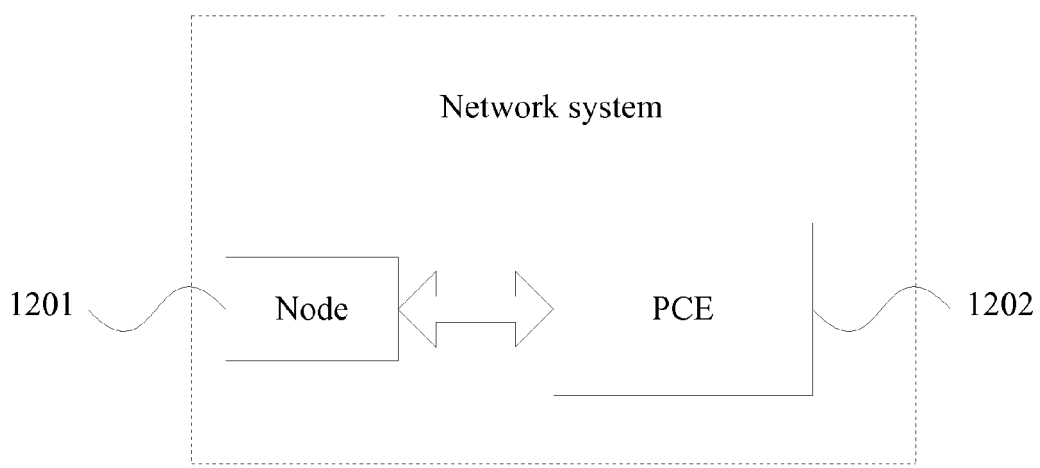
FIG. 12 is a block diagram of a structure of a network system according to Embodiment 7 of the present invention.

FIG. 12 is a block diagram of a structure of a network system according to Embodiment 7 of the present invention. As shown in FIG. 7, Embodiment 7 of the present invention further provides a network system, which includes a node 1201 and a PCE 1202. The PCE 1202 is configured to receive a path computation request message from the node 1201, where the path computation request message carries a network type identifier and traffic parameter constraint conditions of a path required to be computed, the network type identifier indicates a type of a network where the path required to be computed locates; determine the network through the network type identifier, and compute the path in the network according to the traffic parameter constraint conditions; and send a path computation response message to the node 1201, where the path computation response message carries the computed path.

The embodiment of the present invention has the following beneficial effects. A manner of carrying the network type identifier in the path computation request message is adopted, and the path is computed in the network according to the traffic parameter constraint conditions after the network is determined through the network type identifier, so as to overcome the technical problems that the path computation requests in different regions cannot be distinguished, and the bandwidth of floating-point values cannot definitely define path traffic parameter constraints, thereby solving the problem of distinguishing and computing TE paths for various types of services in a multi-region convergence network.

The objectives, technical solutions, and beneficial effects of the present invention are further described in detail through the above specific embodiments. It should be understood that, the above descriptions are merely specific embodiments of the present invention, but not intended to limit the protection scope of the present invention. Any modification, equivalent replacement, or improvement made without departing from the spirit and principle of the present invention should fall within the scope of the present invention.

What is claimed is:

1. A path computation method, comprising:
   performing by a Path Communication Element (PCE) device which includes at least a processor executing algorithms to configure the PCE device to further perform steps, comprising:
   receiving a path computation request message from a Path Computing Client (PCC), wherein the path computation request message includes data that defines a network type identifier and traffic parameter constraint conditions of a path required to be computed, and the network type identifier indicates a type of a corresponding network where the path required to be computed is located, wherein the network type identifier indicates that the corresponding network where the path required to be computed is located is at least one of: a Synchronous Digital Hierarchy (SDH) network, an Optical Transport Network (OTN) or an Ethernet network;
   computing the path in consideration of the network type identifier and the traffic parameter constraint conditions; and
   sending a path computation response message to the PCC, wherein the path computation response message includes data that defines the computed path,
   wherein the network type identifier indicates that the corresponding network where the path required to be computed is located is the OTN, and the traffic parameter constraint conditions comprise a signal type, a concatenation type, and a number of components;

the path computation method further comprising:

the PCE computing the path in the OTN according to the signal type, the concatenation type, and the number of components of the traffic parameter constraint conditions.

2. A path computation method, comprising:

performing by a Path Communication Client (PCC) device comprising at least a processor executing algorithms to configure the PCC device to further perform steps, comprising:

sending a path computation request message to a Path Computation Element (PCE) device, wherein the path computation request message includes data that defines a network type identifier and traffic parameter constraint conditions of a path required to be computed, and the network type identifier indicates a type of a corresponding network where the path required to be computed is located, wherein the network type identifier indicates that the corresponding network where the path required to be computed is located is at least one of: a Synchronous Digital Hierarchy (SDH) network, an Optical Transport Network (OTN) or an Ethernet network; and receiving from the PCE, a path computation response message that includes data that defines the path, wherein the path is obtained after the PCE computes the path in consideration of the network type identifier and the traffic parameter constraint conditions, wherein the network type identifier indicates that the corresponding network where the path required to be computed is located is the OTN, and the traffic parameter constraint conditions comprise a signal type, a concatenation type, and a number of components;

the path computation method further comprising:

the PCE computing the path in the OTN according to the signal type, the concatenation type, and the number of components of the traffic parameter constraint conditions.

3. A Path Computation Element (PCE) device, comprising at least a processor executing algorithms stored in at least a non-transitory memory to configure the PCE device to:

receive a path computation request message from a Path Computing Client (PCC), wherein the path computation request message includes data that defines a network type identifier and traffic parameter constraint conditions of a path required to be computed, and the network type identifier indicates a type of a corresponding network where the path required to be computed is located, wherein the network type identifier indicates that the corresponding network where the path required to be computed is located is at least one of: a Synchronous Digital Hierarchy (SDH) network, an Optical Transport Network (OTN) or an Ethernet network;

determine the network through the network type identifier, and compute the path in the corresponding network according to the traffic parameter constraint conditions; and send a path computation response message to the PCC, wherein the path computation response message includes data that defines the computed path, wherein the network type identifier indicates that the corresponding network where the path required to be computed is located is the OTN, and the traffic parameter constraint conditions comprise a signal type, a concatenation type, and a number of components;

compute the path in the OTN according to the signal type, the concatenation type, and the number of components of the traffic parameter constraint conditions.

* * * * *